Patented June 21, 1938

2,121,732

UNITED STATES PATENT OFFICE 2,121,732

CELLULOSE ETHER RECOVERY

William R. Collings, Midland, Mich., assignor to The Dow Chemical Company, Midland, Mich., a corporation of Michigan No Drawing. Application August 1, 1936, Serial No. 93,763

2 Claims. (Cl. 260—152)

This invention relates to a method for the treatment of the product obtained by the etherification of alkali cellulose with an alkyl halide, and more particularly to a method for the recovery of ethyl cellulose from the product obtained during the reaction of alkali cellulose with ethyl chloride.

The etherification of alkali cellulose with alkyl halides such as methyl bromide, ethyl chloride, propyl chloride, etc., produces a reaction product containing cellulose ether, some unreacted etherifying agent, the alcohol and ether corresponding to the etherifying agent, and alkali halide. It is among the objects of the invention to provide a method for treating said reaction product whereby the alkyl ether of the cellulose is obtained directly therefrom in a solution wherein it can be purified or otherwise treated. Another object of the invention is to provide a method whereby the unreacted etherifying agent can be recovered substantially quantitatively from said reaction product. Still a further object of the invention is to provide a method of separating the alkali halide from the above-described reaction product.

I have now found that the cellulose ether can be separated from such reaction product according to the hereinafter-described procedure without unfavorably changing the physical characteristics of the ether. The reaction product from the etherification step is mixed with a quantity of a monohydric lower aliphatic alcohol, such alcohol being heated substantially to its boiling point under the pressure employed. Ordinarily super-atmospheric pressure is used, although the operation may be carried out at normal or subatmospheric pressure. The alkali halide is precipitated from the reaction mixture and the other products of the reaction are dissolved in the alcohol. The suspension of the alkali halide in such solution is then led into an expansion chamber where the pressure is reduced and the unreacted etherifying agent flash-evaporates therefrom. Some water, alcohol and ether of the etherifying agent, which are present in the reaction mixture, and some of the hot alcohol employed, may also flash-evaporate, or may be carried out in the vapors leaving said expansion chamber. This leaves in the chamber a suspension of the alkali halide in an alcoholic solution of the cellulose ether which may then readily be filtered to separate the solid alkali halide.

My process is applicable to the separation of ethyl cellulose from the mixed products obtained by the reaction of alkali cellulose with an excess of an ethylating agent, such as ethyl chloride. In carrying out this reaction it is customary to use a considerable excess of ethyl chloride; and as a result the reaction product contains unreacted ethyl chloride as well as considerable ethyl alcohol and ethyl ether. The ethylation reaction is normally carried out by heating under pressure at temperatures of about 110°–140° C. According to my procedure the reaction product is preferably discharged from the ethylator under pressure into a vapor-liquid mixture of an alcohol, such as methyl, ethyl, or propyl alcohol, having sufficient available heat content to vaporize the unreacted etherifying agent from the reaction mixture. The mixing of the ethyl cellulose reaction product with the hot alcohol is preferably carried out in a relatively small chamber wherein the ethylator discharge and the alcohol are violently agitated during the mixing process, sufficient alcohol being used to provide the additional heat required to vaporize the ethyl chloride from the mixture, and to retain ethyl cellulose in solution. The resultant hot mixture is then led into a second chamber, under lower pressure, the more volatile constituents, e. g., ethyl chloride, ethyl ether, being flash-evaporated from the mixture, as well as a quantity of alcohol and water, and the vapors collected in any convenient manner, leaving the alcoholic cellulose ether solution containing alkali halide suspended therein. This solution is then filtered to remove the salt and any fibers of unreacted cellulose which may be present therein, after which it can be further treated in known manner to recover the ethyl cellulose. The hot alcohol may, however, be supplied directly to the ethylator, and the alkali halide suspension led therefrom to a flash chamber, if the ethylator is large enough to permit the introduction of sufficient alcohol thereinto to accomplish the desired result.

The following example is illustrative of the practice of the invention:

A reactor was charged with 356 pounds of alkali cellulose containing 26.8 per cent of cellulose, 55.3 per cent of sodium hydroxide, 16.9 per cent of water, and 1.0 per cent of sodium chloride, and thoroughly mixed with 1250 pounds of ethyl chloride. The ethylation of the cellulose was accomplished by heating the mixture at a temperature of 115° C. under a pressure of 225 pounds gauge for about 7 hours. At the end of this time the reactor contents, cooled to a temperature of about 90° C., were fed at a uniform rate over a period of 30 minutes into a stream of 95 per cent ethyl alcohol supplied at its boiling temperature under 30 pounds gauge pressure.

The hot mixture was immediately introduced into an expansion chamber to reduce the pressure thereon, so that ethyl chloride and ethyl ether were flashed off, the vapor leaving the expansion chamber under a pressure of 20 pounds gauge. The quantity of ethyl alcohol used was approximately 1790 pounds. The vapors from the expansion chamber were run through a condenser to recover the ethyl chloride and ethyl ether. The composition of the alcoholic ethyl cellulose solution was: alcohol 82 per cent, ethyl cellulose 5.0 per cent, suspended salt 7.5 per cent, dissolved salt 0.5 per cent, the remainder containing traces of water, etherifying agent, and ether of the etherifying agent. The cellulose ether was recovered from this mixture by precipitation in water after the suspended salt had been filtered out.

While the above example describes the use of ethyl alcohol in the separation of the ethyl cellulose from the mixed products of etherification, other monohydric alcohols such as methyl, propyl, etc., or mixtures of the same, have also been found suitable for my purpose. The process may also be applied to the separation of other cellulosic ethers such as methyl cellulose, propyl cellulose, ethyl propyl cellulose, etc., from the products of etherification reactions yielding the same. In a modification of the above-described procedure, a hot alcoholic solution comprising the reaction products can first be filtered to remove the salt and thereafter manipulated to flash off residual etherification agent, ether, etc. Furthermore, it is not essential that the ethylator product be mixed with the hot alcohol under super-atmospheric pressures, since, if desired, the mixing step may be carried out at atmospheric or sub-atmospheric pressures, and the resulting cellulose ether solution thereafter introduced into an evacuated expansion chamber, thereby flash-evaporating off the more volatile constituents. If desired, various purification and/or bleaching steps, etc., may be carried out on the suspension prior to the removal of salt therefrom, and any solid, alcohol-insoluble material added for such purpose removed along with the salt on filtration.

My method of separating cellulose ethers from the crude etherification product possesses, among others, the following advantages: (1) the cellulose ether is recovered from the crude reaction product in alcoholic solution and may be purified as such, thereby eliminating the steps of separation, washing, drying, and subsequent dissolving of the cellulose compound in alcohol usually required before purification; (2) the unreacted etherifying agent can be substantially quantitatively recovered in an efficient and economical manner; (3) the method lends itself readily to adaptation as a continuous process; (4) the suspended salt serves as a filter aid in removing unreacted cellulose and undesirable gelatinous masses from the product during the filtration step; and (5) under the mild conditions of treatment prevailing during the separation, the characteristics of the cellulose ether are not materially altered, e. g. degradation is minimized.

This application is a continuation in part of my co-pending application Serial No. 93,428, filed July 30, 1936.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of treating the product obtained by reacting alkali cellulose with an excess of an alkyl halide at an elevated temperature and under super-atmospheric pressure, the steps which consist in mixing said reaction product with a sufficient quantity of a lower monohydric aliphatic alcohol to retain said ether in solution when the residual etherifying agents and volatile by-products are removed therefrom, said alcohol being a liquid having a boiling point above that of said etherifying agent, and being supplied at a temperature and pressure such that the mixture obtained has a heat content sufficient to vaporize said residual etherifying agent when the pressure on the mixture is reduced; reducing the pressure on the so-formed mixture to flash off unchanged etherifying agent and other constituents of the reaction mixture which are more volatile than the alcohol employed, whereby the cellulose ether is subjected to a solvent exchange wherein the lower boiling solvent, comprising the residual etherifying agent, is removed and the cellulose ether remains in solution in the relatively higher boiling alcoholic solvent, while the alkali metal halide, formed in the reaction, is undissolved.

2. In a method of treating the product obtained by reacting alkali cellulose with an excess of ethyl chloride at an elevated temperature and under super-atmospheric pressure, the steps which consist in mixing said reaction product comprising ethyl cellulose with a sufficient quantity of a lower monohydric aliphatic alcohol to retain said ethyl cellulose in solution when the residual ethyl chloride and volatile by-products are removed therefrom, said alcohol being a liquid having a boiling point above that of said ethyl chloride, and being supplied at a temperature and pressure such that the mixture obtained has a heat content sufficient to vaporize said residual ethyl chloride when the pressure on the mixture is reduced; reducing the pressure on the so-formed mixture to flash off unchanged ethyl chloride and other constituents of the reaction mixture which are more volatile than the alcohol employed, whereby the ethyl cellulose is subjected to a solvent exchange wherein the lower boiling solvent comprising the residual ethyl chloride is removed and the ethyl cellulose remains in solution in the relatively higher boiling alcoholic solvent, while the sodium chloride formed in the reaction is undissolved.

WILLIAM R. COLLINGS.